US012206192B2

(12) United States Patent
Tang et al.

(10) Patent No.: US 12,206,192 B2
(45) Date of Patent: Jan. 21, 2025

(54) FEMALE CONNECTOR, MALE CONNECTOR AND CONNECTOR ASSEMBLY

(71) Applicant: Tianjin Laird Technologies Limited, Tianjin (CN)

(72) Inventors: Jihai Tang, Tianjin (CN); Yifan Xu, Tianjin (CN); Jingqi Zhao, Tianjin (CN)

(73) Assignee: Tianjin Laird Technologies Limited, Tianjin (CN)

( * ) Notice: Subject to any disclaimer, the term of this patent is extended or adjusted under 35 U.S.C. 154(b) by 408 days.

(21) Appl. No.: 17/772,791

(22) PCT Filed: Dec. 7, 2020

(86) PCT No.: PCT/CN2020/134280
§ 371 (c)(1),
(2) Date: Jun. 22, 2022

(87) PCT Pub. No.: WO2021/083393
PCT Pub. Date: May 6, 2021

(65) Prior Publication Data

US 2022/0407255 A1 Dec. 22, 2022

(30) Foreign Application Priority Data

Oct. 28, 2019 (CN) ......................... 201921830368.5

(51) Int. Cl.
*H01R 13/73* (2006.01)
*H01R 12/73* (2011.01)
(Continued)

(52) U.S. Cl.
CPC ............. *H01R 12/73* (2013.01); *H01R 13/05* (2013.01); *H01R 13/11* (2013.01); *H01R 13/6598* (2013.01)

(58) Field of Classification Search
CPC ...... H01R 13/11; H01R 13/112; H01R 13/03; H01R 13/05; H01R 13/6598; H01R 13/6599; H01R 12/73; H01R 12/724
(Continued)

(56) References Cited

U.S. PATENT DOCUMENTS 5,934,934 A * 8/1999 Ward ................. H01R 13/6599 439/620.09
9,472,900 B1 10/2016 Phillips et al.
(Continued)

FOREIGN PATENT DOCUMENTS

CN 105392271 A 3/2016
CN 106211542 A 12/2016
(Continued)

OTHER PUBLICATIONS

PCT International Search Report and Written Opinion for PCT/CN2020/134280 that is the parent application to the instant application; dated Feb. 25, 2021; 11 pages.
(Continued)

*Primary Examiner* — Marcus E Harcum
(74) *Attorney, Agent, or Firm* — Harness, Dickey & Pierce, P.L.C.; Anthony G. Fussner

(57) ABSTRACT

The present application provides a female connector, a male connector and a connector assembly. The female connector includes: a plurality of female terminals, ends of which are radially expanded outward to form trumpet-shaped guide heads for blind mating with a male connector or a gold finger circuit board; a cantilever section of the female terminal being bent at at least one position to form an elastic pressing portion for an interference fit contact with the male connector or the gold finger circuit board; a first high-frequency radiation area being formed in the vicinity of the trumpet-shaped guide head when the female terminals are mated with
(Continued)

the male connector or the gold finger circuit board; and a first wave-absorbing material is disposed in a spatial scope covered by the first high-frequency radiation area. By selectively disposing a wave-absorbing material in an area where a high-frequency radiation is easily generated during the use of the connector, crosstalk signals are absorbed, while normally transmitted electrical signals are kept, and an overall weight of the connector is light.

13 Claims, 3 Drawing Sheets

(51) Int. Cl.
*H01R 13/05* (2006.01)
*H01R 13/11* (2006.01)
*H01R 13/6598* (2011.01)

(58) Field of Classification Search
USPC .................................................. 439/886, 936
See application file for complete search history.

(56) References Cited

U.S. PATENT DOCUMENTS

| | | | | |
|---|---|---|---|---|
| 9,531,130 | B1 | 12/2016 | Phillips et al. | |
| 9,768,557 | B2 * | 9/2017 | Phillips .............. | H01R 13/6585 |
| 9,871,325 | B2 | 1/2018 | Patel et al. | |
| 10,431,932 | B1 * | 10/2019 | Zhang .................. | H01R 12/724 |
| 10,686,282 | B1 * | 6/2020 | McCarthy .......... | H01R 13/6471 |
| 10,944,189 | B2 * | 3/2021 | Xu ......................... | H01R 12/75 |
| 2016/0324001 | A1 | 11/2016 | Zhai et al. | |
| 2016/0336691 | A1 | 11/2016 | de Boer | |
| 2017/0006698 | A1 | 1/2017 | Huang et al. | |
| 2017/0207579 | A1 * | 7/2017 | Patel ...................... | H05K 1/117 |
| 2019/0173209 | A1 * | 6/2019 | Lu ........................ | H01R 12/716 |
| 2020/0099149 | A1 | 3/2020 | Xu et al. | |
| 2020/0266584 | A1 * | 8/2020 | Lu .......................... | H01R 12/75 |
| 2021/0320461 | A1 * | 10/2021 | Buck ...................... | H01R 12/75 |

FOREIGN PATENT DOCUMENTS

| | | | |
|---|---|---|---|
| CN | 107017526 | A | 8/2017 |
| CN | 107069264 | A | 8/2017 |
| CN | 107069266 | A | 8/2017 |
| CN | 208256947 | U | 12/2018 |
| CN | 208862209 | U | 5/2019 |
| CN | 111029857 | A | 4/2020 |
| CN | 210535884 | U | 5/2020 |
| CN | 210535947 | U | 5/2020 |
| CN | 210692927 | U | 6/2020 |
| CN | 210897863 | U | 6/2020 |
| EP | 1606859 | B1 | 2/2007 |

OTHER PUBLICATIONS

English Translation of the PCT International Search Report and Written Opinion for PCT/CN2020/134280 that is the parent application to the instant application; dated Feb. 25, 2021; 7 pages.

* cited by examiner

FEMALE CONNECTOR, MALE CONNECTOR AND CONNECTOR ASSEMBLY

CROSS-REFERENCE TO RELATED APPLICATION

This patent application is a U.S. national stage filing under 35 U.S.C. § 371 of PCT International Application No. PCT/CN2020/134280 filed Dec. 7, 2020 (published as WO2021/083393 on May 6, 2021), which claims priority to and the benefit of Chinese patent application with an application number of 201921830368.5 filed on Oct. 28, 2019. The entire contents of these applications are incorporated herein by reference in their entirety.

FIELD

The present disclosure relates to a technical field of connectors, and particularly to a female connector, a male connector for mating with the female connector, a gold finger circuit board, and a connector assembly formed by mating the female connector with the male connector or the gold finger circuit board.

BACKGROUND

Connectors are widely used in the electronic field. With the rapid development of the big data, the 5G technology and the artificial intelligence applications, the connector must meet the requirements of high-speed and high-density applications, which challenges the signal integrity design of the connector, especially how to solve the problem of the crosstalk of differential signals under the high frequency/high density.

Usually, there are two traditional solutions: one is to shield a certain pair of differential signals or differential signals on a certain column in the connector by wrapping the same with metal materials and plastic materials after electroplating; and the other is to use an improved grounding method, for example, connecting the grounding pins of each pair of differential signals through conductive plastic or metal. The traditional design method uses too much shielding materials and grounding materials, which leads to negative effects such as an increased connector weight and a large plugging force. Meanwhile, it is very difficult to further realize a higher differential density by the traditional methods.

In addition to the above two methods, in order to solve the problem of the crosstalk of differential signal under a high frequency/high density, the connector or the conductor/conductor pair may be cladded with a wave-absorbing material, so as to eliminate the crosstalk of differential signals through the absorption effect of the wave-absorbing material on electromagnetic waves. However, there is a problem with the traditional way of cladding with the wave-absorbing material, i.e., the wave-absorbing material absorbs electromagnetic waves non-selectively, and while absorbing the crosstalk electromagnetic waves of the differential signals by entirely cladding the connector, the wave-absorbing material absorbs the normally transmitted electrical signals at the same time, and it is easier to destroy the signal integrity of the connector.

SUMMARY

Based on the above defects in the prior art, the embodiments of the present disclosure provide a female connector, a male connector for mating with the female connector, a gold finger circuit board, and a connector assembly formed by mating the female connector with the male connector or the gold finger circuit board. By disposing a wave-absorbing material in an area where a high-frequency radiation is easily generated during the use of the connector, the embodiments of the present disclosure realize the selectivity and the pertinence for the wave-absorbing material to absorb electromagnetic waves, thereby not only absorbing crosstalk signals of differential signals, but also keeping normally transmitted electrical signals. Thus, the signal integrity of the connector is guaranteed, and the overall weight of the connector is light.

In order to achieve the above objective, the present disclosure provides the following technical solutions.

A female connector, including: a plurality of female terminals, ends of which are radially expanded outward to form trumpet-shaped guide heads for blind mating with a male connector or a gold finger circuit board; a first high-frequency radiation area being formed in the vicinity of the trumpet-shaped guide head when the female terminals are mated with the male connector or the gold finger circuit board; and a first wave-absorbing material disposed in a spatial scope covered by the first high-frequency radiation area.

A male connector for mating with the aforementioned female connector, including: a male terminal for mating with the plurality of female terminals, and having a male insertion tip inserted into the female terminals; a second high-frequency radiation area being formed in the vicinity of the male insertion tip when the male terminal is mated with the female terminals; and a second wave-absorbing material disposed in a spatial scope covered by the second high-frequency radiation area.

A connector assembly, including: a male connector including a plurality of male terminals; a female connector for mating with the male connector; the female connector including a plurality of female terminals mated with the male terminals, and ends of the female terminals being radially expanded outward to form trumpet-shaped guide heads for blind mating with the male connector; a first high-frequency radiation area being formed in the vicinity of the trumpet-shaped guide head when the female terminals are mated with the male terminals; and a first wave-absorbing material disposed in a spatial scope covered by the first high-frequency radiation area.

A gold finger circuit board for mating with the aforementioned female connector, including: a gold finger insertion tip inserted into the female terminals, a third high-frequency radiation area being formed in the vicinity of the gold finger insertion tip when the gold finger circuit board is mated with the female connector; and a third wave-absorbing material is disposed in a spatial scope covered by the third high-frequency radiation area.

A connector assembly, including: a gold finger circuit board with a gold finger insertion tip; a female connector for mating with the gold finger circuit board; the female connector including a plurality of female terminals mated with the gold finger insertion tip, and ends of the female terminals being radially expanded outward to form trumpet-shaped guide heads for blind mating with the gold finger circuit board; a first high-frequency radiation area being formed in the vicinity of the trumpet-shaped guide head when the female terminals are mated with the gold finger insertion tip; and a first wave-absorbing material disposed in a spatial scope covered by the first high-frequency radiation area.

In the embodiments of the present disclosure, it is creatively discovered and found out that a high-frequency radiation area can easily occur due to an antenna effect during the use of the connector, and practices show that the wave-absorbing material only needs to be disposed in the high-frequency radiation area rather than other areas without a high-frequency radiation. By selectively or pertinently disposing the wave-absorbing material, signals are also selectively absorbed by the wave-absorbing material. That is, only crosstalk signals are absorbed without affecting normal signals, so that the integrity of differential signals can be well ensured.

In addition, the way of selectively or pertinently disposing a wave-absorbing material in a high-frequency radiation area is adopted to replace the way of entirely cladding (a plastic bracket and a shell) with a wave-absorbing material in the prior art, so as to overcome the signal crosstalk without using any additional shielding material, which not only greatly reduces the use amount of the wave-absorbing material, as well as an overall weight and costs of consumables and process implementation of the connector, but also helps in improving the density of differential pairs, and meeting the application requirements of high-speed and high-density connectors in the current technical development.

DETAILED DESCRIPTION

Figure 1:
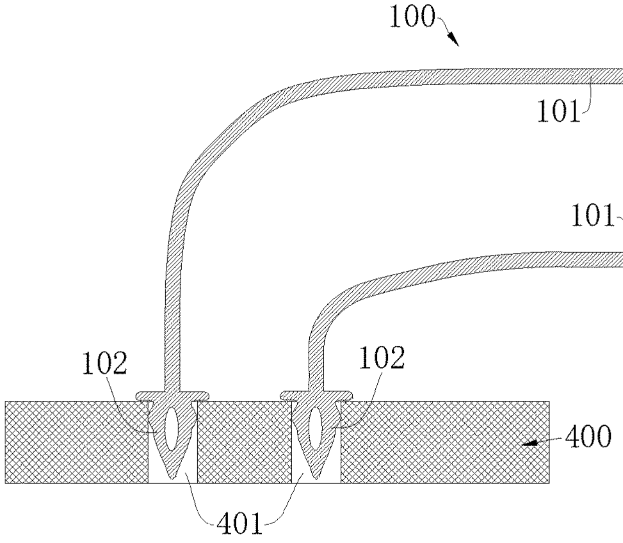
FIG. 1 is a structural diagram of a connector assembly formed by mating a female connector and a gold finger circuit board according to a first non-limiting embodiment in the present disclosure.

In order to make persons in this technical field better understand the technical solutions in the present disclosure, the technical solutions of the embodiments of the present disclosure will be clearly and completely described below with reference to the drawings for the embodiments of the present disclosure. Obviously, those described are only a part, rather than all, of the embodiments of the present disclosure. Based on the embodiments in the present disclosure, any other embodiment obtained by those of ordinary skills in the art without paying any creative labor should fall within the spatial protection scope of the present disclosure.

It should be noted that when an element is referred to as being 'disposed on' another element, it may be directly on another element or there may be an intermediate element. When an element is considered as being 'connected to' to another element, it may be directly connected to another element or there may be an intermediate element. The terms 'vertical', 'horizontal', 'left', 'right' and similar expressions used herein are for illustration purposes only, and are not intended to indicate a unique embodiment.

Unless otherwise defined, all of the technical and scientific terms used herein have the same meanings commonly understood by a person skilled in the technical field of the present disclosure. The terms used in the specification of the present disclosure are only for the purpose of describing specific embodiments, and are not intended to limit the present disclosure. As used herein, the term 'and/or' includes any and all combinations of one or more related listed items.

As illustrated in FIGS. 1 to 6, an embodiment of the present disclosure provides a female connector 100, a male connector 200 for mating with the female connector 100, a gold finger circuit board 300, and a connector assembly formed by mating the female connector 100 with the male connector 200 or the gold finger circuit board 300.

The female connector 100 includes a plurality of female terminals 101. The female terminal 101 has two opposite ends, i.e., a first end (a right end as illustrated in FIG. 1 and an upper end as illustrated in FIG. 3) for mating with the male connector 200 or the gold finger circuit board 300, and a second end (a lower end as illustrated in FIGS. 1 and 3) facing away from the first end for an electrical connection with a PCB board 400.

Figure 3:
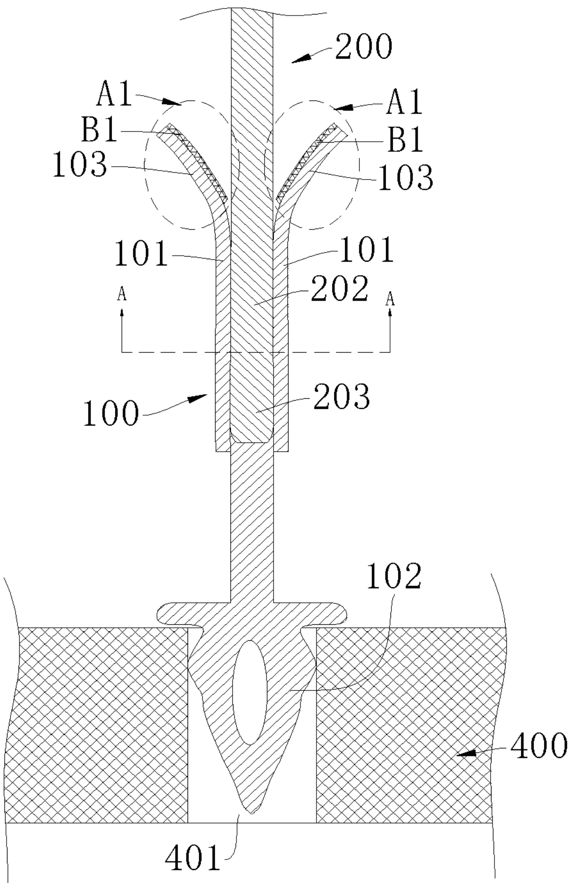
FIG. 3 is a structural diagram of a connector assembly formed by mating a female connector and a male connector according to a second non-limiting embodiment in the present disclosure.

As illustrated in FIGS. 1 and 3, the second end of the female terminal 101 may be electrically connected to the PCB board 400 by plugging. Specifically, the second end of the female terminal 101 forms a crimping ring 102 capable of elastically contracting and deforming, and the PCB board 400 is provided with a through hole or blind hole 401. The second end is inserted into the through hole or blind hole 401, and the crimping ring 102 are radially elastically contracted and deformed, and abuts against an inner wall of the through hole or blind hole 401 to achieve an interference fit.

Of course, the above is only one possible way to electrically connect the female terminal 101 with the PCB board 400, and any other way is also feasible, which is not limited here. For example, the second end of the female terminal 101 is bent to form a soldering connection portion which is soldered with a pad on a surface of the PCB board 400, so as to achieve an electric connection therebetween.

In order to make the male connector 200 or the gold finger circuit board 300 successfully mate with the female connector 100, an end (specifically, the first end) of the female terminal 101 is radially expanded outward to form a trumpet-shaped guide head 103 for blind mating the male connector 200 or the gold finger circuit board 300 with the female connector 100. In this way, an operator can hold the male connector 200 or the gold finger circuit board 300 to successfully complete a mating operation with the female connector 100 under the guidance of the trumpet-shaped guide head 103.

In addition, in order to ensure a good electrical connection between the male connector 200 or the gold finger circuit board 300 and the female connector 100 after the mating, the female terminal 101 includes an elastic cantilever section 104, which is bent at at least one position to form an elastic pressing portion 105 for an interference fit contact with the male connector 200 or the gold finger circuit board 300. In this embodiment, one of the elastic pressing portions 105 is disposed close to the trumpet-shaped guide head 103.

Figure 2:
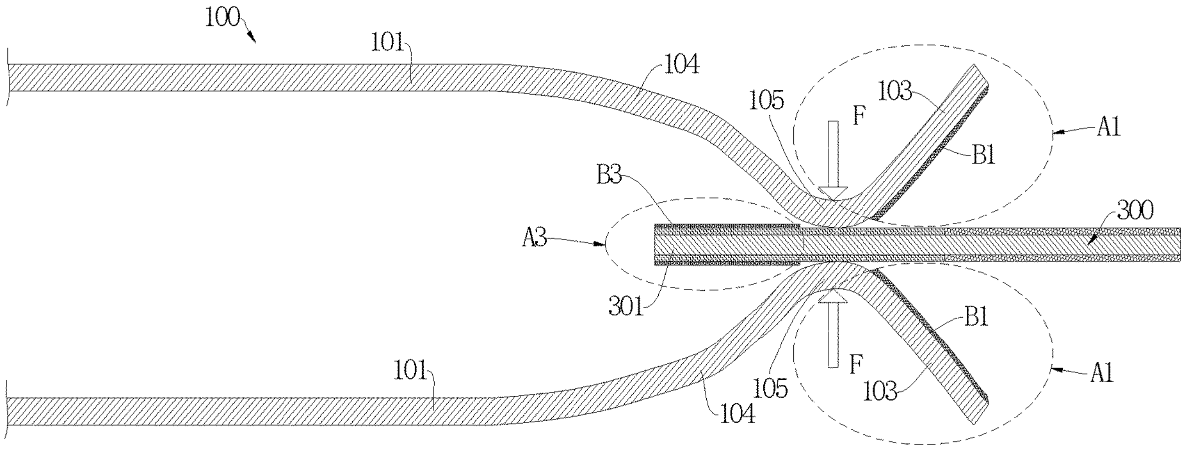
FIG. 2 is a partially enlarged structural diagram of the connector assembly illustrated in FIG. 1.

The cantilever section 104 has a preset length, so as to have an elastic force F for unidirectionally pressing/bidirectionally clamping the male connector 200 or bidirectionally clamping the gold finger circuit board 300. As illustrated in FIGS. 1 and 2, the gold finger circuit board 300 is bidirectionally clamped by the elastic pressing portions 105 formed on the cantilever section 104. Since the gold finger circuit board 300 is bidirectionally clamped by the elastic pressing portions 105, the gold finger circuit board 300 comes into a single-point contact with the single female terminal 101, thereby realizing a better mating between the gold finger circuit board 300 and the female terminal 101.

In this embodiment, there may be only one elastic pressing portion 105 formed on the cantilever section 104. At this time, the mating between the gold finger circuit board 300 and the female connector 100 is in a case of straight male-bent female.

Since the bending performance of the traditional gold finger circuit board 300 is poor, the gold finger circuit board 300 in this embodiment can follow the straight male in the prior art. However, with the development of technologies, the bendable or flexible gold finger circuit board 300 is gradually used. It is feasible that the gold finger circuit board 300 is prepared in a bent or flexed shape. Therefore, this embodiment does not exclude a case of bent male-bent female for the mating between the gold finger circuit board 300 and the female connector 100.

Figure 4:
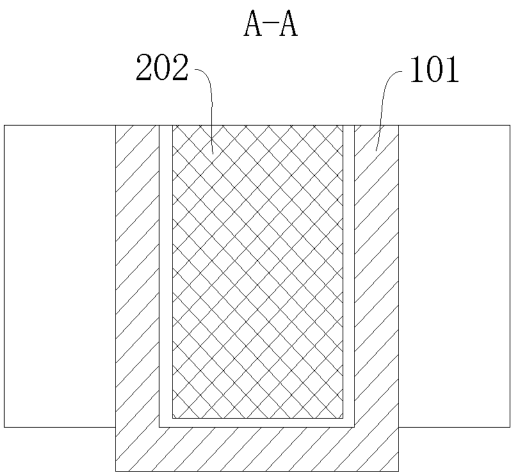
FIG. 4 is a structural diagram of a section A-A in FIG. 3.

The mating between the female terminal 101 and the male connector 200 may be unidirectional pressing or bidirectional clamping. As illustrated in FIGS. 3 and 4, a male terminal 202 of the male connector 200 is bidirectionally clamped by the female terminals 101. The specific situation is similar to the above embodiment where the gold finger circuit board 300 is bidirectionally clamped by the female terminal 101, which will not be repeated here.

However, unlike the case where the gold finger circuit board 300 is bidirectionally clamped by the female terminals 101, in the embodiment where the male terminal 202 of the male connector 200 is bidirectionally clamped by the female terminals 101 as illustrated in FIGS. 3 and 4, the elastic pressing portion 105 may not be formed on the cantilever section 104 of the female terminal 101, and the male terminal 202 of the male connector 200 may be clamped only by the elasticity of the cantilever section 104 itself. At this time, the mating between the male connector 200 and the female connector 100 is in a case of straight male-straight female.

Figure 5:
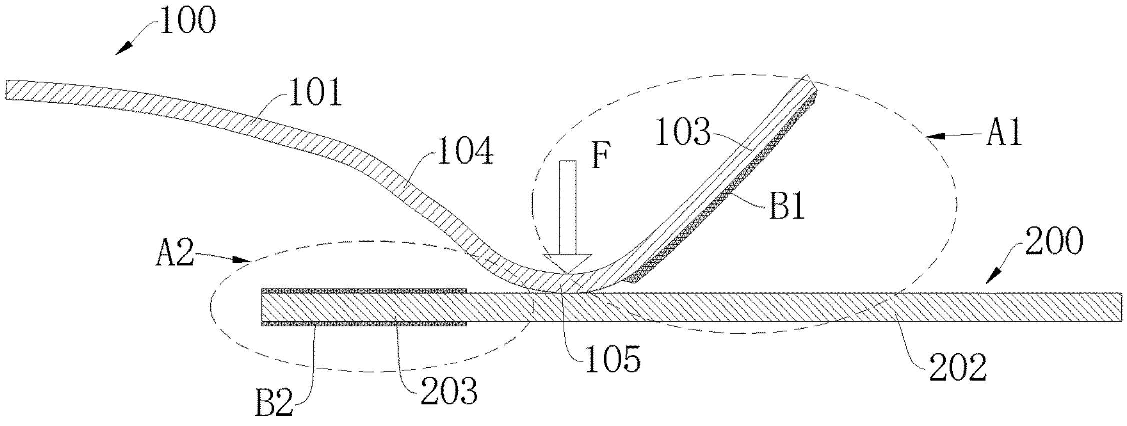
FIG. 5 is a structural diagram of a single-point contact mating between a female connector and a male connector in the present disclosure.
Figure 6:
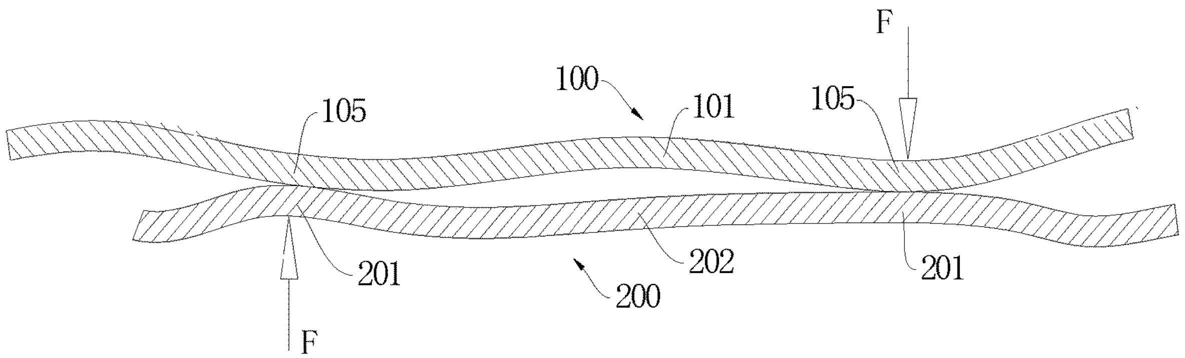
FIG. 6 is a structural diagram of a multi-point contact mating between a female connector and a male connector in the present disclosure.

In the embodiment illustrated in FIGS. 5 and 6, it is the case where the female terminal 101 presses the male terminal 202 of the male connector 200 unidirectionally, wherein the female terminal 101 and the male terminal 202 of the male connector 200 may be mated through a single-point contact (see the embodiment illustrated in FIG. 5) under the condition that the female terminal 101 can contact well with the male terminal 202 of the male connector 200. At this time, the mating between the male connector 200 and the female connector 100 is in a case of straight male-bent female.

Of course, the female terminal 101 and the male terminal 202 of the male connector 200 may also be mated through a two-point or more-point contact (see the embodiment illustrated in FIG. 6), i.e., at this time, two or more elastic pressing portions 105 are formed on the cantilever section 104 of the female terminal 101, and two or more elastic fitting portions 201 are also formed on the male terminal 202. The two or more elastic fitting portions 201 contact the two or more elastic pressing portions 105 to realize the two-or-more-point contact between the male terminal 202 and the female terminal 101. At this time, the mating between the male connector 200 and the female connector 100 is in a case of bent male-bent female.

The female connector 100 is mated with the male connector 200 or the gold finger circuit board 300, so that the differential signal is transmitted from one end to the other (the first end→the second end, or the second end→the first end). At a position where the female connector 100 is mated with the male connector 200 or the gold finger circuit board 300, the transmission of the differential signal depends on the female terminal 101 and a portion where the male connector 200 or the gold finger circuit board 300 contacts the female terminal 101. Specifically, the differential signal is transmitted via the female terminal 101 and a surface of the portion where the male connector 200 or the gold finger circuit board 300 contacts the female terminal 101.

Since the end of the female terminal 101 forms the trumpet-shaped guide head 103, the trumpet-shaped guide head 103 is exposed and suspended after the male connector 200 or the gold finger circuit board 300 is mated with the female connector 100. Therefore, due to an antenna effect, electric charges are accumulated on a surface of the trumpet-shaped guide head 103, and then a high-frequency radiation area A1 (named as a first high-frequency radiation area A1 for distinction) is formed in the vicinity of the trumpet-shaped guide head 103. The existence of the first high-frequency radiation area A1 will greatly interfere with the differential signal transmitted via the female terminal 101 and the portion where the male connector 200 or the gold finger circuit board 300 contacts the female terminal 101.

As described above, in order to solve the problem of the crosstalk of differential signals, the wave-absorbing material may be used to absorb the crosstalk signals, and specifically, the connector is entirely wrapped with the wave-absorbing material. However, the way of full wrapping with the wave-absorbing material will lead to an undifferentiated signal absorption, which is even more detrimental to the integrity of the differential signal. In addition, the full wrapping with the wave-absorbing material will increase the overall weight of the connector, and consume a lot of wave-absorbing materials, so the costs of consumables and process implementation are high.

In view of this, after long-term in situ practices, the inventor of the present disclosure found that the above problem can be well solved by pertinently disposing a wave-absorbing material in an area where the high-frequency radiation is likely to occur due to the antenna effect, while not disposing the wave-absorbing material in other areas where no high-frequency radiation occurs. In this embodiment, a first wave-absorbing material B1 is disposed in a spatial scope covered by the first high-frequency radiation area A1.

Since being selectively or pertinently disposed in the spatial scope covered by the first high-frequency radiation area A1, the first wave-absorbing material B1 can absorb the crosstalk signal on the one hand, without affecting the normal differential signal transmitted via the female terminal 101 and the portion where the male connector 200 or the gold finger circuit board 300 contacts the female terminal 101, thereby ensuring the integrity of the differential signal. On the other hand, the first wave-absorbing material B1 is only disposed in the spatial scope covered by the first high-frequency radiation area A1, and a use amount thereof is small, so that the female connector 100 of this embodiment is lighter in weight and lower in cost compared with the connector entirely wrapping by the wave-absorbing material in the prior art.

In this embodiment, the spatial scope covered by the first high-frequency radiation area A1 is a virtual space, which may be substantially radial or spherical in a three-dimensional space. Actually, the size or dimension of the spatial scope covered by the first high-frequency radiation area A1 is related to many factors, such as a signal intensity, a material of the female terminal 101, a material of the male terminal 202/a gold finger insertion tip 301 mated with the female terminal 101, a signal frequency, a resonance frequency, etc., which is not limited here.

Thus, as long as the position for disposing the first wave-absorbing material B1 falls within the spatial scope covered by the first high-frequency radiation area A1, the specific position and way for disposing the first wave-absorbing material B1 and the material form thereof may be relatively free and flexible. Generally, the first wave-absorbing material B1 may support a wide frequency operation scope from 1 GHZ to 100 GHZ, and the material form may be a solid form (for example, including but not limited to, layer, sheet, film, block, plate, strip, cylinder), a liquid form, powder and plastic particles, etc., and the disposing way may be adopted according to the different material forms to adapt to different occasions, including but not limited to, adhesion, hot melting, electroplating, brushing, painting, filling, injection molding, etc. Therefore, the first wave-absorbing material B1 may be customized according to the signal frequency, the resonance frequency, etc., to improve the application range of the technical solution of this embodiment.

For example, in a feasible embodiment, the first wave-absorbing material B1 may be directly disposed on the female terminal 101. Specifically, the position for disposing the first wave-absorbing material B1 may be the surface (inner surface or outer surface) of the trumpet-shaped guide head 103, and the material form may be a coating or a sticking layer. In which, the material form of the first wave-absorbing material B1 as a coating may be realized by a process such as spraying or electroplating, and the material form as a sticking layer may be realized by preparing the first wave-absorbing material B1 into layers or sheets, which are then stuck by viscose glue, or fixed by hot melting, etc. The size and the thickness of the coating or the sticking layer may be set according to the actual situation, and are not limited here.

Alternatively, the female terminal 101 is partially wrapped and fixed by a plastic bracket, and the trumpet-shaped lead 103 has an exposed portion that is not wrapped by the plastic bracket. The position for disposing the first wave-absorbing material B1 may be the exposed surface of the trumpet-shaped guide head 103, and the material form may be a coating or a sticking layer. Furthermore, the first wave-absorbing material B1 may cover part or all of the exposed surface of the trumpet-shaped guide head 103.

Following the above description, in another feasible embodiment, the first wave-absorbing material B1 may be disposed on a plastic bracket (not illustrated). Specifically, the first wave-absorbing material B1 is disposed close to the trumpet-shaped guide head 103, so as to be as close as possible to a high-frequency radiation source. The material form may be a coating or a sticking layer, or a solid form. As described above, when the material form is a coating or a sticking layer, the first wave-absorbing material B1 may be disposed on the surface of the plastic bracket. When the material form is a solid form, such as block, plate, sheet and any other tangible physical shape, the first wave-absorbing material B1 may be fixed on the plastic bracket in any suitable way, for example including but not limited to, snap-fit connection, mechanical fastener connection by bolts and other fastening structures, soldering by ultrasonic, solvent, laser, etc., hot melting, clamping, snap connection, hook connection and integrated fastening features.

Further, the plastic bracket may be accommodated in a shell. Thus, in another feasible embodiment, the first wave-absorbing material B1 may be disposed on a shell (not illustrated). Specifically, the first wave-absorbing material B1 is disposed close to the trumpet-shaped guide head 103, so as to be as close as possible to the high-frequency radiation source. The material form may be a coating or a sticking layer, or a solid form. Please refer to the above description for detail, which will not be repeated here.

Of course, the above embodiments are merely a few feasible schematic solutions, rather than restrictive solutions. That is, the position and way for disposing the first wave-absorbing material B1 and the material form thereof include but are not limited to the above embodiments. In other feasible embodiments, for example, when the first wave-absorbing material B1 is prepared in the form of liquid, powder, plastic particles, etc., a suitable implementation process may be adopted according to actual demands, which is not limited here.

It should be noted that the plastic bracket, shell, etc. included in the female connector 100 of the embodiment of the present disclosure may adopt any suitable existing configuration. In order to clearly and briefly explain the technical solution provided by this embodiment, the above parts will not be described in detail here, and the drawings for the specification are also simplified accordingly. However, it should be understood that the embodiments of the present disclosure are not limited thereto in the spatial scope.

Based on the same concept, an embodiment of the present disclosure further provides a connector assembly formed by the mating of the female connector 100 and the male connector 200 or the gold finger circuit board 300 described in the above embodiments. Since the principle for the connector assembly to solve problems and the technical effect that can be achieved are similar to those of the female connector 100, the implementation of the female connector 100 as described above may be referred to for the implementation of the connector assembly, and the repeated content will be omitted here.

It should be noted that as an independent embodiment, the connector assembly provided in the embodiment of the present disclosure may refer to the female connector 100 as described above, but should not be limited to the effect produced by the female connector 100.

An embodiment of the present disclosure further provides a male connector 200 for mating with the female connector 100 described in the above embodiments and a connector assembly formed by the mating of the male connector 200 and the female connector 100. As illustrated in FIGS. 3 to 6, the male connector 200 includes a male terminal 202 for mating with the plurality of female terminals 101, and the male terminal 202 has a male insertion tip 203 inserted into the female terminal 101.

As illustrated in FIGS. 5 and 6, in some embodiments, being similar to the principle of the generation of the first high-frequency radiation area A1 as described above, the male insertion tip 203 is exposed and suspended after the mating between the male connector 200 and the female connector 100, so that another high-frequency radiation area A2, i.e., a second high-frequency radiation area A2, can be easily formed in the vicinity of the male insertion tip 203 due to the antenna effect.

Similarly, in order to attenuate the interference of the second high-frequency radiation area A2 on the differential signal transmitted via the female terminal 101 and the male terminal 202, a second wave-absorbing material B2 is disposed in a spatial scope covered by the second high-frequency radiation area A2. As illustrated in FIGS. 5 and 6, the second wave-absorbing material B2 may clad a surface of the male insertion tip 203 in the form of a coating or a sticking layer.

In the embodiment where the connector assembly is formed by the mating between the male connector 200 and the female connector 100, the first wave-absorbing material B1 and the second wave-absorbing material B2 may be respectively disposed in the spatial scopes covered by the first high-frequency radiation area A1 and the second high-frequency radiation area A2.

In the embodiment illustrated in FIGS. 3 and 4, after being inserted into the female terminal 101, the male insertion tip 203 of the male terminal 202 is surrounded or semi-surrounded by the female terminal 101 (as illustrated in FIG. 4), without being exposed and suspended. Therefore, in this embodiment, a radiation intensity in the vicinity of the male insertion tip 203 is weak, and it is unnecessary to absorb waves there. Of course, when the male insertion tip 203 is semi-surrounded by the female terminal 101, the wave-absorbing material may be disposed on an exposed surface of the male insertion tip 203 (an upper surface as illustrated in FIG. 4).

Embodiments of the present disclosure further provide a gold finger circuit board 300 for mating with the female connector 100 described in the above embodiments and a connector assembly formed by the mating of the gold finger circuit board 300 and the female connector 100. As illustrated in FIGS. 1 and 2, the gold finger circuit board 300 has a gold finger insertion tip 301 inserted into the female terminal 101. Being similar to the principle of the generation of the first high-frequency radiation area A1 and the second high-frequency radiation area A2 as described above, the gold finger insertion tip 301 is exposed and suspended after the mating between the gold finger circuit board 300 and the female connector 100, so that a high-frequency radiation area, i.e., a third high-frequency radiation area A3, can also be easily formed in the vicinity of the gold finger insertion tip 301 due to the antenna effect.

Similarly, in order to attenuate the interference of the third high-frequency radiation area A3 on the differential signal transmitted via the female terminal 101 and the gold finger insertion tip 301, a third wave-absorbing material B3 is disposed in a spatial scope covered by the third high-frequency radiation area A3. As illustrated in FIGS. 1 and 2, the third wave-absorbing material B3 may clad a surface of the gold finger insertion tip 301 in the form of a coating or a sticking layer.

In the embodiment where the connector assembly is formed by mating the gold finger circuit board 300 and the female connector 100, the first wave-absorbing material B1 and the third wave-absorbing material B3 may be respectively disposed in the spatial scopes covered by the first high-frequency radiation area A1 and the third high-frequency radiation area A3.

In the embodiments of the present disclosure, it is creatively discovered and found out that a high-frequency radiation area can easily occur due to an antenna effect during the use of the connector, and practices show that the wave-absorbing material only needs to be disposed in the high-frequency radiation area rather than other areas without a high-frequency radiation. By selectively or pertinently disposing the wave-absorbing material, signals are also selectively absorbed by the wave-absorbing material. That is, only crosstalk signals are absorbed without affecting normal signals, so that the integrity of differential signals can be well ensured.

In addition, the way of selectively or pertinently disposing a wave-absorbing material in a high-frequency radiation area is adopted to replace the way of entirely cladding (a plastic bracket and a shell) with a wave-absorbing material in the prior art, so as to overcome the signal crosstalk without using any additional shielding material, which not only greatly reduces the use amount of the wave-absorbing material, as well as an overall weight and costs of consumables and process implementation of the connector, but also helps in improving the density of differential pairs, and meeting the application requirements of high-speed and high-density connectors in the current technical development.

In the description of the present disclosure, the terms ‘first’ and ‘second’ are only used for the descriptive purpose and to distinguish similar objects. These terms neither specify any sequential order, nor indicate or imply relative importance. In addition, in the description of the present disclosure, ‘a plurality of’ means two or more unless otherwise stated.

Those described above are just a few embodiments of the present disclosure, and a person skilled in the art can make various changes or modifications to the above embodiments according to the content disclosed in the application document without departing from the spirit and scope of the present disclosure.

The invention claimed is:

1. A female connector comprising:

a plurality of female terminals including ends that are radially expanded outward in opposite directions relative to each other to form at least one trumpet-shaped guide head for blind mating with a male connector or a gold finger circuit board;

a first high-frequency radiation area formed in the vicinity of the trumpet-shaped guide head when the female terminals are mated with the male connector or the gold finger circuit board; and a first wave-absorbing material selectively or pertinently disposed only in a spatial scope covered by the first high-frequency radiation area where high-frequency radiation is likely to occur due to an antenna effect while not disposing the first wave-absorbing material in other areas where no high-frequency radiation occurs, such that only crosstalk signals are absorbed by the first wave-absorbing material without affecting normal differential signals transmitted via the female terminal(s), thereby ensuring the integrity of the differential signal.

2. The female connector according to claim 1, wherein the first wave-absorbing material is disposed only on an inner surface or an outer surface of the trumpet-shaped guide head.

3. The female connector according to claim 1, wherein the first wave-absorbing material only clads part or all of an exposed surface of the trumpet-shaped guide head.

4. The female connector according to claim 1, wherein the first wave-absorbing material is disposed close to the trumpet-shaped guide head.

5. The female connector according to claim 1, wherein a cantilever section of each said female terminal is bent at, at least one position to form an elastic pressing portion for an interference fit contact with the male connector or the gold finger circuit board.

6. A male connector for mating with the female connector according to claim 1, the male connector comprising:

a male terminal for mating with the plurality of female terminals, the male terminal having a male insertion tip insertable into the female terminals;

a second high-frequency radiation area being formed in the vicinity of the male insertion tip when the male terminal is mated with the female terminals; and a second wave-absorbing material selectively or pertinently disposed only in a spatial scope covered by the second high-frequency radiation area where high-frequency radiation is likely to occur due to the antenna effect while not disposing the second wave-absorbing material in other areas where no high-frequency radiation occurs, such that only crosstalk signals are absorbed by the second wave-absorbing material without affecting normal differential signals transmitted via the female terminal(s), thereby ensuring the integrity of the differential signal.

7. The male connector according to claim 6, wherein the second wave-absorbing material only clads a surface of the male insertion tip.

8. A connector assembly comprising:

a male connector comprising a plurality of male terminals;

a female connector for mating with the male connector, the female connector comprising:

a plurality of female terminals for mating with the male terminals, the female terminals including ends radially expanded outward are radially expanded outward in opposite directions relative to each other to form at least one trumpet-shaped guide head for blind mating with the male connector;

a first high-frequency radiation area formed in the vicinity of the trumpet-shaped guide head when the female terminals are mated with the male terminals; and a first wave-absorbing material selectively or pertinently disposed only in a spatial scope covered by the first high-frequency radiation area where high-frequency radiation is likely to occur due to an antenna effect while not disposing the first wave-absorbing material in other areas where no high-frequency radiation occurs, such that only crosstalk signals are absorbed by the first wave-absorbing material without affecting normal differential signals transmitted via the female terminal(s), thereby ensuring the integrity of the differential signal.

9. The connector assembly according to claim 8, wherein a male terminal comprises:

a male insertion tip insertable into the female terminals;

a second high-frequency radiation area formed in the vicinity of the male insertion tip when the male terminal is mated with the female terminals; and a second wave-absorbing material selectively or pertinently disposed only in a spatial scope covered by the second high-frequency radiation area where high-frequency radiation is likely to occur due to the antenna effect while not disposing the second wave-absorbing material in other areas where no high-frequency radiation occurs, such that only crosstalk signals are absorbed by the second wave-absorbing material without affecting normal differential signals transmitted via the female terminal(s), thereby ensuring the integrity of the differential signal.

10. The connector assembly according to claim 8, wherein:

a cantilever section of each female terminal is bent to form one or more elastic pressing portions for an interference-fit contact with the male terminal; and each female terminal is in a single-point or multi-point contact with the male terminal through the one or more elastic pressing portions.

11. A connector assembly comprising:

a gold finger circuit board with a gold finger insertion tip;

a female connector for mating with the gold finger circuit board, the female connector comprising:

a plurality of female terminals for mating with the gold finger insertion tip, the female terminals including ends radially expanded outward are radially expanded outward in opposite directions relative to each other to form at least one trumpet-shaped guide head for blind mating with the gold finger circuit board;

a first high-frequency radiation area formed in the vicinity of the trumpet-shaped guide head when the female terminal is mated with the gold finger insertion tip; and a first wave-absorbing material selectively or pertinently disposed only in a spatial scope covered by the first high-frequency radiation area where high-frequency radiation is likely to occur due to an antenna effect while not disposing the first wave-absorbing material in other areas where no high-frequency radiation occurs, such that only crosstalk signals are absorbed by the first wave-absorbing material without affecting normal differential signals transmitted via the female terminal(s), thereby ensuring the integrity of the differential signal.

12. The connector assembly according to claim 11, wherein:

a third high-frequency radiation area is formed in the vicinity of the gold finger insertion tip when the gold finger circuit board is mated with the female connector, and a third wave-absorbing material is selectively or pertinently disposed only in a spatial scope covered by the third high-frequency radiation area where high-frequency radiation is likely to occur due to the antenna effect while not disposing the third wave-absorbing material in other areas where no high-frequency radiation occurs, such that only crosstalk signals are absorbed by the third wave-absorbing material without affecting normal differential signals transmitted via the female terminal(s), thereby ensuring the integrity of the differential signal.

13. The connector assembly according to claim 11, wherein:

a cantilever section of each female terminal is bent to form an elastic pressing portion for an interference fit contact with the gold finger insertion tip; and the female terminal is in a single-point contact with the gold finger insertion tip through the elastic pressing portion.

* * * * *